United States Patent [19]

Regelson

[11] 3,859,433

[45] Jan. 7, 1975

[54] ANTIVIRAL TREATMENT

[75] Inventor: William Regelson, Richmond, Va.

[73] Assignee: Hercules Incorporated, Wilmington, Del.

[22] Filed: Apr. 30, 1973

[21] Appl. No.: 355,610

Related U.S. Application Data

[60] Division of Ser. No. 218,025, Jan. 14, 1972, , which is a division of Ser. No. 54,022, July 10, 1970, abandoned, which is a continuation-in-part of Ser. No. 716,257, March 6, 1968, abandoned, which is a continuation-in-part of Ser. No. 577,675, Sept. 7, 1966, abandoned.

[52] U.S. Cl. ............................ 424/85, 424/78

[51] Int. Cl. ..................... A61k 15/00, A61k 23/00
[58] Field of Search ............................ 424/78, 85

Primary Examiner—Elbert L. Roberts
Attorney, Agent, or Firm—Marion C. Staves

[57] ABSTRACT

Certain water-soluble copolymers prepared from divinyl ether and maleic anhydride have been found to suppress virus growth. Administration of said copolymers not only suppresses growth in infected animals but also increases resistance to virus infection in healthy animals by stimulating the production of interferon.

1 Claim, No Drawings

ANTIVIRAL TREATMENT

This is a division of application Ser. No. 218,025, filed Jan. 14, 1972, which in turn is a division of application Ser. No. 54,022, filed July 10, 1970, now abandoned, which in turn is a continuation-in-part of application Ser. No. 716,257, filed Mar. 6, 1968, now abandoned, which in turn is a continuation-in-part of application Ser. No. 577,675, filed Sept. 7, 1966, now abandoned.

This invention relates to a method of suppressing virus growth. More specifically, this invention relates to a method of inhibiting or retarding certain virus growth and preventing its propagation by inactivation of the virus and/or increasing host resistance to the virus infection.

It has now surprisingly been discovered that certain water-soluble copolymers prepared from divinyl ether and maleic anhydride in mole ratios of 1:2 and their physiologically tolerated salts are effective as antiviral agents in various animals. It will be understood that the term "animal," as used throughout the specification and claims of this application, is meant to include humans. The above mentioned copolymers are characterized by having an RSV of from about 0.04 to about 1.8 and as having the following recurring unit:

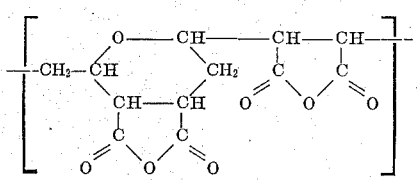

It will be obvious to those skilled in the art that these copolymers will hydrolyze on contact with water to produce the free acid.

The term "Reduced Specific Viscosity" (RSV), which is a function of molecular weight, is used herein to designate the specific viscosity measured at a temperature of 25°C. on a 0.1 percent solution of the copolymer in a one molar aqueous solution of sodium hydroxide.

Unlike some antiviral agents, the copolymers used in this invention are relatively nontoxic. For example, when injected intraperitoneally in mice they were found to have an $LD_{50}$ of greater than 800 mg./kg. By the term "$LD_{50}$" is meant lethal dose to 50 percent of the animals being tested.

Most of the chemotherapeutic agents currently in use in the treatment of virus infections exert their activity through direct physical combination with the virus or by modifying the ability of the virus to attach or replicate or to be released from within the infected cell.

The exceptionally high activity of these copolymers as antiviral agents is multiple in that they are active both in vitro and in vivo. They possess in vitro viral neutralization by direct physical combination with the virus. On the other hand, they exhibit surprising in vivo activity in reducing the quantity of virus present in the injected tissue following virus infection. They also increase the host resistance to virus infection on pretreatment by stimulating the reticuloendothelial system to induce the production of interferon. Interferon is a protein produced by animal and human cells which possesses nonspecific antiviral activity against a wide spectrum of viral pathogens. Exemplary of the viruses which can be treated with divinyl ether--maleic anhydride copolymer in accordance with this invention are the virus of vesicular exanthema, equine encephalomyelitis, influenza A, herpes simplex, tick-borne encephalitis, Newcastle disease, mumps, measles (Rubeola), measles (Rubella), distemper, Friend virus, bovine papillomatosis, vaccinia, encephalomyocarditis, smallpox, fowl-pox, bovine vesicular stomatitis virus, serum hepatitis, swine fever (hog cholera), Mengo virus, Mareks disease and fowl leukosis.

The copolymers can be employed in aqueous solution or dissolved in physiological sterile saline solution. In addition, various pharmaceutical preparations can be compounded which contain the active substance along with liquid or solid diluents. Solid preparations for extemperaneous dilution can be formulated employing various buffering agents as well as local anesthetics and other medicinal agents such as antibiotics, hypnotics, analgesics, etc., and inorganic salts to afford desirable pharmacological properties to the composition. Administration will be by one of the conventional intramuscular, subcutaneous, intravenous or intraperitoneal routes.

Divinyl ether--maleic anhydride copolymer can be used to treat animals which are actually infected with a virus or to immunize animals which may be exposed to a virus. Thus the copolymer acts not only as a medication but as a prophylactic. In any case, dosages in the order of 0.5 to 300 mg./kg. daily of the copolymers are highly effective in inhibiting virus in animals and in increasing resistance to the disease in healthy animals by inducing the production of interferon. The specific dosage will depend upon the route of administration and duration of treatment. Since the active copolymers are stable and widely compatible, they can be administered in solution or suspension in a variety of pharmacological acceptable vehicles including water, propylene glycol, diethylcarbonate, glycerol, or oils such as peanut oil, sesame oil, olive oil, etc.

As stated above, the physiologically tolerated salts of the copolymers can be used in the process of this invention. Exemplary salts are the water-soluble salts of alkali metals as for example sodium, potassium, etc.; ammonium salts, salts of such amines as methylamine, dimethylamine, ethylamine, diethylamine, butylamine, aniline, methoxyamine, piperidine, morpholine, etc.; mixed salts containing ammonia and a primary or secondary amine, etc.

The copolymers used in the process of this invention can be produced by copolymerizing divinyl ether and maleic anhydride in an aromatic diluent at a mole ratio of about 1:2 using a free radical initiator (e.g., benzoyl peroxide, azo bis(isobutyronitrile) etc.). The use of chain transfer agents (i.e. $CCl_4$, $BrCCl_3$, etc.) in the copolymerization is optional.

The following example shows the preparation of a typical divinyl ether-maleic anhydride copolymer.

A polymerization vessel was charged with 197.2 parts of maleic anhydride, 704 parts of benzene and 1276 parts of carbon tetrachloride. After dissolution of the maleic anhydride, the solution was sparged with nitrogen and 70.2 parts of distilled divinyl ether was added with agitation. Then with vigorous agitation there was added 1.45 parts of benzoyl peroxide dissolved in benzene. Within 20 seconds, copolymerization started and the solution became cloudy and then gelatinous. After about 3 ½ hours, the swollen polymer was removed and repeatedly extracted with benzene and then dried under vacuum. The resulting divinyl ether-maleic anhydride copolymer had an RSV of 0.34 (molecular weight of approximately 36,000) and represented a conversion of 89 percent. The divinyl ether and maleic anhydride were present in the copolymer in the molar ratio of 1:2.

It will be understood that by conducting the copolymerization under various reaction conditions in the presence of different free radical initiators and in the presence or absence of chain transfer agents, copolymers of various molecular weights can be prepared.

The following examples are presented to illustrate the process of this invention.

EXAMPLE 1

This example illustrates the induced production of interferon by treating Swiss white mice with a divinyl ether--maleic anhydride copolymer containing divinyl ether and maleic anhydride in a 1:2 mole ratio and having an RSV of 0.34 (molecular weight of approximately 36,000). Six groups containing five mice each were all injected intraperitoneally with 125 mg./kg. body weight of the copolymer in sterile saline solution. The groups of mice were sacrificed as follows: the first group, immediately; the second after 12 hours; the third after 24 hours, the fourth after 48 hours; the fifth after 72 hours; and the sixth after 144 hours. The pooled mouse serum from each group was tested to determine the units of interferon produced according to the procedure of Kleinschmidt et al P.N.A.S. 52: 741, 1964. The results of these tests are tabulated below along with results of control groups of five mice each injected with sterile saline solution alone:

| | Units of Interferon Present | |
|---|---|---|
| Hours | Mice Injected with Copolymer | Controls |
| 0 | < 10 units | < 10 units |
| 12 | 90 do. | do. |
| 24 | 159 do. | do. |
| 48 | 25 do. | do. |
| 72 | < 20 do. | do. |
| 144 | < 20 do. | do. |

EXAMPLE 2

This example illustrates the production of interferon using divinyl ether--maleic anhydride copolymers of varying molecular weight. Four groups of Swiss white mice containing five mice each received intraperitoneal injections of 125 mg./kg. body weight of the copolymer in sterile saline solution with each group receiving a different molecular weight copolymer. All of the mice were sacrificed 24 hours after treatment and the pooled mouse serum from each group tested to determine the units of interferon present as described above. The results of these tests are tabulated below:

| Divinyl ether-maleic anhydride molecular weight | Units of Interferon Present |
|---|---|
| 17,000 | 187 |
| 40,000 | 219 |
| 110,000 | 246 |
| 450,000 | 205 |

EXAMPLE 3

This example illustrates the effectiveness of divinyl ether--maleic anhydride copolymers of different molecular weights in the post-treatment of mice infected with Friend virus. The activity of these copolymers is particularly pronounced against Friend virus which is responsible for the production of a splenomegaly (enlargement of the spleen). Since the growth of the spleen in Friend viral infection is associated with the quantity of virus present, splenomegaly as well as increased survival can be used as an index of antiviral activity.

The Friend virus used in this example and examples 4–8 was obtained from the spleens of 8-week old male Swiss white mice 4 weeks after infection. The virus was obtained immediately after sacrifice by filtering a 10 percent homogenate of pooled spleens in cold Locke-Ringer's solution through a 0.45 micron millipore filter. In those examples in which the mice were injected with Friend virus, they were given a 0.2 ml. injection intraperitoneally of the above-described filtrate or some dilution thereof, except in example 7 where the injection was intravenously.

Groups of 10 male Swiss white mice were infected by intraperitoneal injection with the Friend virus and 24 hours later treatment with a copolymer was started. Each mouse received six intraperitoneal injections of 250 mg./kg. of body weight of copolymer dissolved in sterile saline solution. Dosages were administered at the rate of one per day. Groups of control mice in the number indicated were handled exactly the same way except they were administered injections of sterile saline solution. The mice surviving were sacrificed eight days after the last injection, their spleens removed and carefully weighed.

The copolymers used in this example contained divinyl ether and maleic anhydride in a 1:2 mole ratio. The molecular weight of the copolymers, the number of mice treated and the number of controls, the number of mice which survived the test, average initial mouse weight, average final mouse weight, average spleen weight and percent inhibition evidenced by a comparison of spleen weights of the treated mice versus spleen weights of the controls are tabulated below:

| | Copolymer | |
|---|---|---|
| RSV | 0.34 | 1.5 |
| Molecular weight | 36,000 | 450,000 |
| Mice, treated/controls | 10/20 | 10/10 |
| Survivors, treated/controls | 8/19 | 10/8 |
| Initial mouse weight, gms. treated/controls | 16.3/16.5 | 14.5/14.6 |
| Final mouse weight, gms. treated/controls | 20.2/25.4 | 21.2/21.1 |
| Spleen weight, mg. treated/controls | 430/1192 | 763/1650 |
| Inhibition, % | 64 | 54 |

EXAMPLE 4

This example illustrates the effectiveness of a copolymer containing a divinyl ether--maleic anhydride in a 1:2 mole ratio and having an RSV of 0.34 (molecular weight of 36,000) in the pretreatment of mice to be infected with Friend virus. Groups of male Swiss white mice received one or more intraperitoneal injections of the copolymer dissolved in sterile saline solution. Where more than one injection was administered, it was conducted at the rate of one per day. Controls were handled exactly the same way except they were administered injections of sterile saline solution. Approximately 24 hours after the last injection of the pretreatment each mouse was infected with Friend virus by an intraperitoneal injection. Eight days after the virus injection, the surviving mice were sacrificed and their spleens removed and carefully weighed. The mg./kg. of body weight of copolymer administered, the number of days it was administered, the number of mice pretreated and the number of controls, the number of mice which survived the test, average initial mouse weight, average final mouse weight, average spleen weight and percent inhibition evidenced by a comparison of spleen weights of the treated mice with the spleen weights of the control mice are tabulated in Table I.

Table I

| Dosage mg./kg. | No. of Days | No. of Mice treated/controls | Survivors Treated/controls | Initial wt. gms. t/c | Final wt. gms. t/c | Spleen wt. mg. t/c | Inhibition % |
|---|---|---|---|---|---|---|---|
| 250 | 6 | 20/20 | 15/20 | 15.3/15.2 | 24.8/28.8 | 417/1537 | 73 |
| 125 | 6 | 20/20 | 17/17 | 13.7/13.8 | 26.5/30.6 | 378/1286 | 71 |
| 62.5 | 6 | 20/20 | 19/17 | 13.7/13.8 | 29.3/30.6 | 332/1286 | 74 |
| 31.25 | 6 | 10/10 | 7/9 | 17.8/17.9 | 22.3/29.0 | 177/783 | 77 |
| 15.6 | 6 | 10/20 | 7/17 | 15.6/15.8 | 28.8/29.4 | 274/1741 | 84 |
| 250 | 1 | 20/20 | 20/20 | 17.3/17.3 | 23.8/26.1 | 447/873 | 49 |
| 125 | 1 | 10/10 | 10/10 | 15.2/15.3 | 29.3/28.4 | 441/1669 | 74 |
| 15 | 1 | 5/5 | 5/5 | 17.6/17.6 | 26.2/28.2 | 281/1023 | 72 |
| 5 | 1 | 5/5 | 5/5 | 17.6/17.6 | 28.2/28.2 | 418/1023 | 59 |

EXAMPLE 5

This example demonstrates the actual decrease in virus titer after pretreatment with a divinyl ether---maleic anhydride. The decrease is evidenced by the failure of splenic homogenates obtained from mice infected with Friend virus after pretreatment with the copolymer to stimulate splenomegaly in a second group of mice.

The divinyl ether--maleic anhydride copolymer described in Example 4, in sterile saline solution, was administered to 20 male Swiss white mice by intraperitoneal injection in an amount of 125 mg./kg. body weight at a rate of one injection per day for six days. 24 hours after the last injection the mice were infected with the Friend virus by intraperitoneal injection. A group of 20 control mice were treated exactly the same way except they were pretreated with sterile saline solution. Four days after the mice were infected with virus the survivors were sacrificed and their spleens removed. The spleens from the treated mice and controls were separately pooled and homogenized as 10 percent suspensions in cold Locke-Ringers solution and filtered through a 0.5 millipore filter. The separate filtrates were diluted $10^{-1}$ and 0.5 cc. aliquots injected intraperitoneally into groups of 5 male Swiss white mice. After 8 days the surviving mice were sacrificed, their spleens removed and carefully weighed. The number of mice which survived the test, the average initial weight, the average final weight and the average weight of the spleens are tabulated in Table II.

Table II

|  | Controls (Saline Pretreatment) | Copolymer Pretreatment |
|---|---|---|
| Survived test | 5 | 5 |
| Initial wt., gms. | 15.0 | 14.6 |
| Final wt., gms. | 23.4 | 27.4 |
| Spleen wt., mg. | 859 | 166 |

EXAMPLE 6

This example illustrates the direct in vitro antiviral action of the divinyl ether--maleic anhydride copolymer described in Example 4, as evidenced by the decrease in splenomegaly obtained when the Friend virus filtrate used to infect the mice is first incubated for 30 minutes at room temperature with varying amounts of copolymer per ml of filtrate.

As stated above, the Friend virus filtrate was first incubated at room temperature for 30 minutes with the copolymer and then injected intraperitoneally into groups of 5 male Swiss white mice. Control mice were handled in exactly the same way except the Friend virus was incubated with a sterile saline solution. After 8 days the surviving mice were sacrificed, their spleens removed and carefully weighed. The concentration of the copolymer, the dilution of the Friend virus filtrate, the number of mice which survived the test, the average initial weight of the mice, the average final weight of the mice, and the average spleen weight are tabulated in Table III.

Table III

| Treatment | Conc. of Copolymer mg./ml of Filtrate | % Dilution of Friend Virus Filtrate | Survivors | Initial weight gms. | Final weight gms. | Spleen weight mg. |
|---|---|---|---|---|---|---|
| Saline control | 0 | 10 | 5 | 15.6 | 27.2 | 1,108 |
| do. do. | 0 | 1 | 5 | 15.0 | 27.2 | 366 |
| do. do. | 0 | 0.1 | 5 | 15.4 | 27.8 | 248 |
| Copolymer | 100 | 10 | 5 | 15.2 | 27.0 | 256 |
| do. | 100 | 1 | 5 | 16.4 | 24.0 | 201 |
| do. | 100 | 0.1 | 5 | 15.6 | 25.6 | 304 |
| do. | 10 | 1 | 5 | 15.6 | 27.0 | 200 |
| do. | 1 | 0.1 | 5 | 14.2 | 26.8 | 179 |

EXAMPLE 7

This example illustrates the effectiveness of a divinyl ether--maleic anhydride copolymer pretreatment when the mice are to be infected with Friend virus via the intravenous route. (Note that in examples 3–6 the mice were infected with the virus by the intraperitoneal route.) In this way the chance of the copolymer interacting directly with the virus is minimized even when the two are administered the same day.

Groups of 10 male Swiss mice received one intraperitoneal injection of the copolymer described in Example 4 dissolved in sterile saline solution in an amount of 200 mg./kg. body weight prior to intravenous injection with the Friend virus. Controls were handled exactly the same way except they received an injection of sterile saline solution. Eight days after infection the surviving mice were sacrificed, their spleens removed and carefully weighed. The dilution of the Friend virus filtrate, the number of mice which survived the test, average initial weight of the mice, average final weight of the mice, average spleen weight, percent inhibition and period of time between the pretreatment with the copolymer and infection with the virus are tabulated in Table IV.

Table IV

| Treatment | % Dilution of Friend Virus Filtrate | Survivors | Initial weight gms. | Final weight gms. | Spleen weight mg. | % Inhibition | Period of time |
|---|---|---|---|---|---|---|---|
| Saline control | 10 | 9 | 16.6 | 29.3 | 1,515 | — | — |
| do. | 1 | 10 | 16.5 | 29.2 | 637 | — | — |
| Copolymer pretreatment | 10 | 6 | 16.7 | 23.3 | 1,094 | 48 | 4 days |
| do. | 1 | 9 | 16.7 | 25.6 | 481 | 74 | do. |
| do. | 10 | 4 | 16.6 | 19.7 | 533 | 85 | 24 hours |
| do. | 1 | 8 | 16.5 | 24.1 | 517 | 68 | do. |
| do. | 10 | 6 | 16.4 | 25.0 | 772 | 70 | 1 hour |
| do. | 1 | 8 | 16.4 | 24.3 | 465 | 76 | do. |

EXAMPLE 8

This example illustrates the increase in survival of mice treated with a divinyl ether--maleic anhydride copolymer before and after virus infection.

A group of 20 male Swiss white mice were given intraperitoneally 125 mg./kg. body weight of the copolymer described in Example 4 dissolved in sterile saline solution. Four days later they were infected by intraperitoneal injection with the Friend virus. Following the infection the mice were given an intraperitoneal injection of 125 mg./kg. body weight of the copolymer every 4th day until they died. A group of 20 control mice were handled exactly the same way except they were given intraperitoneal injections of sterile saline solution instead of the copolymer. The survival time of the treated mice and controls is plotted on Graph No. 1.

EXAMPLE 9

This example illustrates the effectiveness of the divinyl ether--maleic anhydride copolymer described in Example 4 in combatting $T_4$ bacteriophage virus as evidenced by a reduction in the inhibition of bacterial growth. Since this virus inhibits the growth of bacteria, any reduction in this inhibition is an indication of a suppression of the virus.

Two 9 cm. Petri dishes each containing two layers of culture media were prepared. The first or bottom layer amounted to 10 ml. and was prepared using 1.5 parts agar, 1 part casein hydrolyzate, 0.5 part sodium chloride and 100 parts sterile distilled water. The second or top layer contained the virus and bacteria and amounted to approximately 2.6 ml. The culture media in the top layer was prepared using 0.75 part agar, 1 part casein hydrolyzate, 0.5 part sodium chloride and 100 parts sterile distilled water. To each 2.5 ml. portion of the top culture media was added 0.05 ml. of an E. coli (Strain B) inoculum and 0.05 ml. of a 1:125,000 dilution of $T_4$ bacteriophage. To one portion was added 0.05 ml. of a $1 \times 10^{-4}$ molar solution of the copolymer in water (the molecular weight of the copolymer was 36,000). To the other portion (i.e., the control) was added 0.05 ml. of sterile distilled water. In each case the top culture media was poured over the surface of the bottom media and rocked gently for even distribution. After hardening, the plates were inverted and incubated overnight at 37°C. Each plate was then observed, the number of plaques (voids) counted and the growth of bacteria determined from optical density readings using a visible spectrophotometer. The results are tabulated below (the figures represent an average of three determinations):

| Number of Plaques in | | Percent Plaque Reduction | Growth of E. coli in | | Percent Growth Reduction of Bacteria |
|---|---|---|---|---|---|
| Absence | Presence of Copolymer | | Absence | Presence of Copolymer | |
| 330 | 210 | 36 | .60 | .60 | 0 |

From the above it can be seen that the presence of the copolymer causes a 36 percent reduction in plaque formation thus indicating a suppression in viral activity.

EXAMPLE 10

This example illustrates the induced production of interferon in human patients upon administration of a divinyl ether--maleic anhydride copolymer containing divinyl ether and maleic anhydride in a 1:2 mole ratio and having a molecular weight of approximately 17,000. Six human patients were administered intravenous infusions of the copolymer in sterile saline solution. In each case the injections were 100 cc., the difference being in the concentration of the copolymer present. Dosages varied from 12 mg./kg. body weight to 16 mg./kg. body weight and administration from a single injection to two injections. In each case from about 5 cc. to about 20 cc. of serum were removed from the patient every 24 hours for 6 days beginning before the first administration of the copolymer. Each sample of serum was assayed for interferon on human neonate foreskin fibroblasts in a plague reduction assay employing bovine vesicular stomatitus virus as described in Virology, Vol. 29, pages 515–522 (1966). The mg./kg. of body weight of copolymer administered per injection, the number of injections, and the units of serum interferon/4 ml. are tabulated in Table V.

tion of sterile saline solution 18 hours before being infected with the Mengo virus. The mg./kg. body weight of copolymer administered, the number of mice infected with the virus, the number of mice surviving 10 days after infection and the percent survival are tabulated in Table VI.

Table V

| Patient | Dosage | | Serum Interferon, Units/4 ml. | | | | |
|---------|--------|-----------------------|---------------------|-----------------|-----------------|-----------------|-----------------|
| | mg./kg. | Number of Injections | Before Treatment | After 24 hrs.[1] | After 48 hrs.[1] | After 72 hrs.[1] | After 96 hrs.[1] |
| A | 12 | 1 | 0 | 0 | 10 | N.D.[2] | N.D.[2] |
| B | 15 | 1 | 0 | 15 | 22 | 4 | N.D.[2] |
| C | 12 | 2 | 0 | 0 | 13 | 0 | 0 |
| D | 12 | 2 | 0 | 0 | 18 | 0 | 0 |
| E | 16 | 1 | 0 | 0 | 18 | 0 | 0 |
| F | 16 | 2 | 0 | N.D.[2] | 40 | N.D.[2] | 21 |

[1] In the case of the patients who received two injections, the hours were counted from the time of the first injection.
[2] Not determined.

EXAMPLE 11

This example illustrates the effectiveness of a copolymer containing a divinyl ether--maleic anhydride in a 1:2 mole ratio and having an RSV of 0.34 (molecular weight of 36,000) in the pretreatment of mice to be infected with vaccinia virus. The virus used in this example was grown in rabbit kidney tissue. 20 female Swiss white mice weighing 12 gm. ± 1 gm. were given one intraperitoneal injection of the copolymer dissolved in sterile saline solution in an amount equivalent to 125 mg./kg. of body weight 24 hours before being infected by intravenous injection of the vaccinia virus. 17 female Swiss white mice weighing 12 gm. ± 1 gm. were used as controls and not pretreated with the copolymer. Eight days after injection with $4 \times 10^6$ plaque forming units of the vaccinia virus, the tail of each mouse was stained with a solution of 1 percent fluoroscein- 0.5 percent methylene blue in water, and the number of pox on each tail counted under a mercury vapor lamp of wave-length 3340–3906 A.U. The average number of lesions on the tails of those animals pretreated with the copolymer was 8. The average number of lesions on the tails of the control mice was 30. This represents a 63 percent reduction in the number of lesions on the tails of those mice pretreated with the copolymer.

The same experiment was used with New Zealand white female rabbits, and the reduction in the number of skin lesions on the pretreated rabbits was approximately 70 percent.

EXAMPLE 12

This example illustrates the effectiveness of a divinyl ether--maleic anhydride copolymer in the pretreatment of mice to be infected with Mengo virus. The copolymer used contained divinyl ether and maleic anhydride in a 1:2 mole ratio and had a molecular weight of approximately 17,000. Groups of Swiss white mice weighing about 25 gm. ± 1 gm. received an intraperitoneal injection of the copolymer dissolved in sterile saline solution 18 hours before being injected intraperitoneally with $2 \times 10^8$ plaque forming units of Mengo virus. One group of control mice received an intraperitoneal injec- Table VI

| Dosage | Number of mice infected | Survivors | Percent Survived |
|--------|-------------------------|-----------|------------------|
| 25 mg./kg. | 12 | 11 | 91 |
| 5 mg./kg. | 12 | 7 | 58 |
| 1 mg./kg. | 19 | 11 | 58 |
| Controls | 42 | 3 | 7 |

EXAMPLE 13

This example illustrates the effectiveness of the copolymer described in Example 12 when administered intravenously in the pretreatment of mice to be infected with Mengo virus. The procedure was the same as described in Example 12 except the copolymer was administered to the mice by intravenous injection 18 hours before the mice were infected with the Mengo virus. The mg./kg. body weight of copolymer administered, the number of mice infected with the virus, the number of mice surviving 10 days after infection and the percent survival are tabulated below:

| Dosage | Number of mice infected | Survivors | Percent Survival |
|--------|-------------------------|-----------|------------------|
| 60 mg./kg. | 10 | 7 | 70 |
| Controls | 10 | 0 | 0 |

EXAMPLE 14

This example illustrates the period of time pretreated mice are protected from Mengo virus by the copolymer described in Example 12. Groups of Swiss white mice as described in Example 12 received an intraperitoneal injection of 125 mg./kg. of body weight of the copolymer dissolved in sterile saline solution from one day to 60 days before being injected intraperitoneally with $2 \times 10^8$ plaque forming units of Mengo virus. One group of control mice received an intraperitoneal injection of sterile saline solution 24 hours before being infected with the Mengo virus. The number of days before infection the mice received the copolymer, the number of mice infected, the number of mice surviving 10 days after infection and the percent survival are tabulated in Table VII.

Table VII

| Number of days copolymer given before infection | Number of mice infected | Survivors | Percent survival |
|---|---|---|---|
| 1 | 17 | 15 | 88 |
| 2 | 10 | 9 | 90 |
| 5 | 10 | 6 | 60 |
| 8 | 10 | 6 | 60 |
| 14 | 9 | 8 | 88 |
| 32 | 8 | 5 | 62 |
| 60 | 24 | 13 | 54 |
| Controls | 50 | 3 | 6 |

EXAMPLE 15

This example illustrates the in vitro activity of a divinyl ether--maleic anhydride copolymer with herpes virus (M.R.S.). The copolymer used contained divinyl ether and maleic anhydride in a 1:2 mole ratio and had a molecular weight of approximately 3700. The copolymer was dissolved 1 mg./ml. in 0.9 percent saline solution, mixed with an equal volume of freshly thawed herpes virus and incubated for 30 minutes at 37°C. Then, serial 10-fold dilutions of the resulting mixtures were made in Hanks' solution and the residual infectivity determined by plating the diluted samples on rabbit kidney monolayers. The plaques were allowed to form under an agar medium at 4°C. and were then counted. The average count for copolymer treated virus was 50. A control treated exactly the same way except for the copolymer treatment gave an average count of 1,000,000.

EXAMPLE 16

This example illustrates the effectiveness of various divinyl ether--maleic anhydride copolymers in combatting encephalomyocarditis.

Groups of white mice were infected intranasally with $10XLD_{50}$ of encephalomyocarditis virus. In each case the white mice were treated with 100 mg./kg./day of the copolymer. The administration of the copolymer began 44 hours before infection with the virus and was given intraperitoneally 44, 26, 19 and 3 hours before infection. One dose of the copolymer was given 4 hours after infection with the virus. A group of control mice were treated the same way except a sterile saline solution was substituted for the copolymer treatment. The molecular weight of the copolymer and its RSV, the number of mice in the group and the number of survivors is tabulated below:

| Copolymer* Molecular Weight | RSV | No. of mice | No. of survivors |
|---|---|---|---|
| 3,700 | 0.09 | 10 | 10 |
| 27,000 | 0.29 | 7 | 7 |
| 96,000 | 0.61 | 14 | 13 |
| 140,000 | 0.79 | 9 | 9 |
| 325,000 | 1.24 | 9 | 8 |
| Control | — | 20 | 0 |

*The copolymers contained divinyl ether and maleic anhydride in a 1:2 mole ratio.

EXAMPLE 17

This example illustrates the effectiveness of various divinyl ether--maleic anhydride copolymers in combatting influenza A.

Groups of white mice were infected intranasally with $10XLD_{50}$ of influenza A virus. In each case, the mice were treated with the copolymer by intraperitoneal injections according to the following schedule: 44, 26, 19 and 3 hours before infection, and 4, 21, 28, 45 and 52 hours after infection. A group of control mice were treated the same way except a sterile saline solution was substituted for the copolymer treatment. The molecular weight of the copolymer and its RSV, the dosage, the number of mice in each group and the percent which survived are tabulated below:

| Copolymer* Molecular Weight | RSV | Dosage mg./kg./day | No. of Mice | Percent Survived |
|---|---|---|---|---|
| 3,700 | 0.09 | 100 | 8 | 25 |
| 3,700 | 0.09 | 50 | 15 | 13.3 |
| 96,000 | 0.61 | 50 | 9 | 22.2 |
| Control | — | — | 20 | 0 |

*The copolymer contained divinyl ether and maleic anhydride in a 1:2 mole ratio.

EXAMPLE 18

This example illustrates the effectiveness of divinyl ether--maleic anhydride copolymer induced mouse serum interferon against bovine vesicular stomatitis virus.

Groups of Swiss white mice were injected intraperitoneally with 125 mg./kg. body weight of a divinyl ether--maleic anhydride copolymer containing divinyl ether and maleic anhydride in a 1:2 mole ratio and having a molecular weight of approximately 40,000. The mice were bled 18 hours after the copolymer treatment and the serum interferon activity determined in a plaque inhibition assay on L cells against bovine vesicular stomatitis virus. The serum interferon from the copolymer treated mice was effective against the virus while serum from control mice not treated with the copolymer was ineffective.

What I claim is:

1. A process of immunizing an animal exposed to encephalomyocarditis virus which comprises administering to said animal at least one dosage of from about 0.5 to 300 mg./kg. of body weight of an antiviral agent selected from divinyl ether--maleic anhydride copolymers and physiologically tolerated salts of divinyl ether--maleic anhydride copolymers, said copolymers containing divinyl ether and maleic anhydride in a mole ratio of about 1:2 and having a reduced specific viscosity of from about 0.04 to about 1.8.

* * * * *